UNITED STATES PATENT OFFICE.

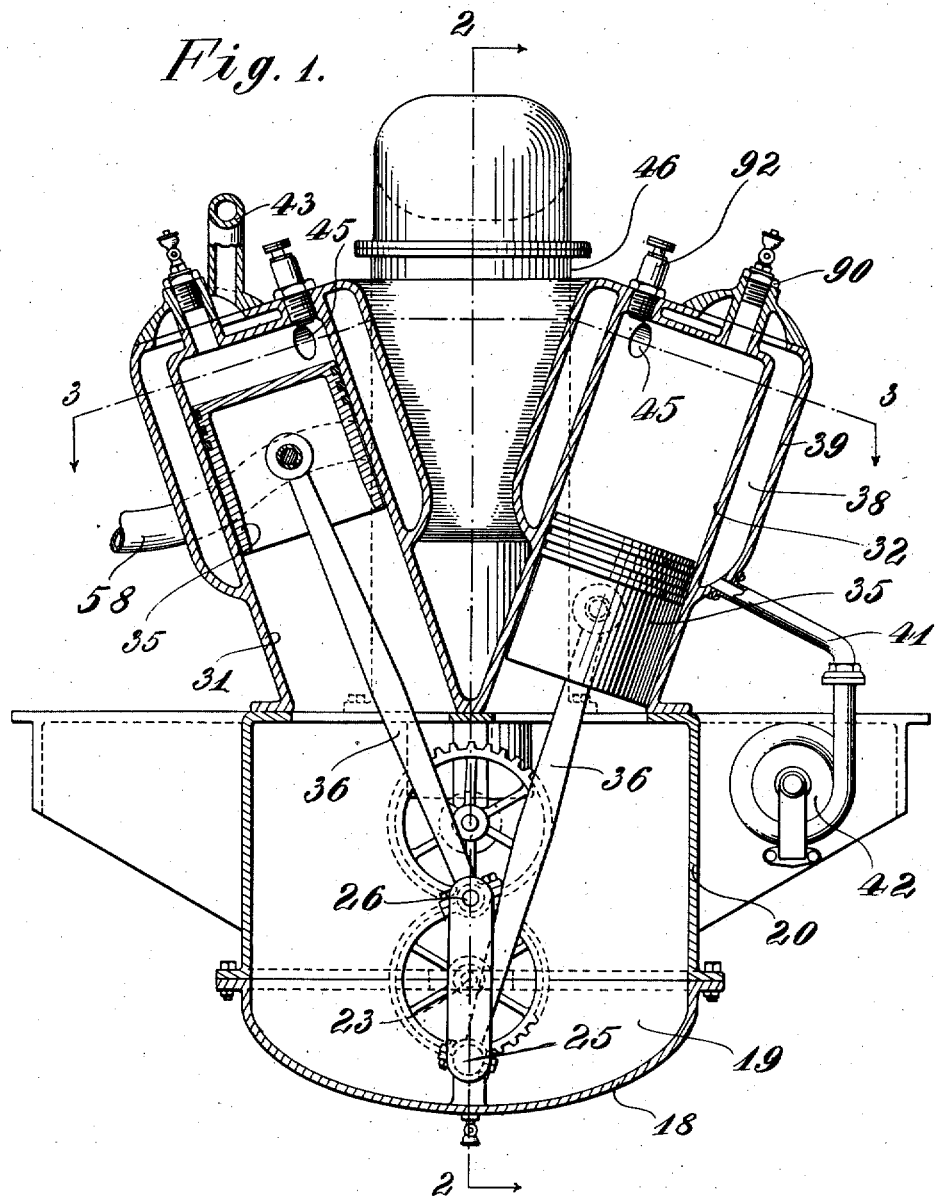

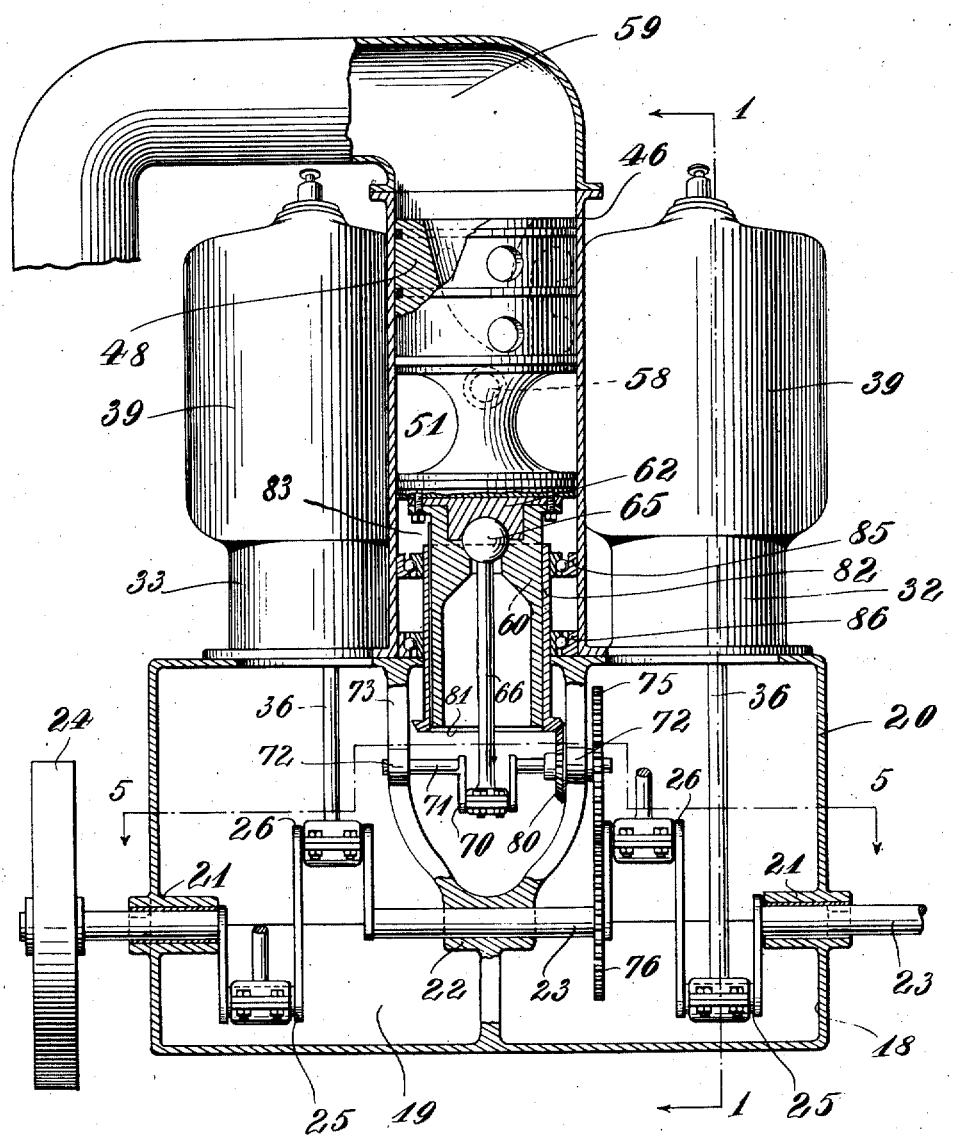

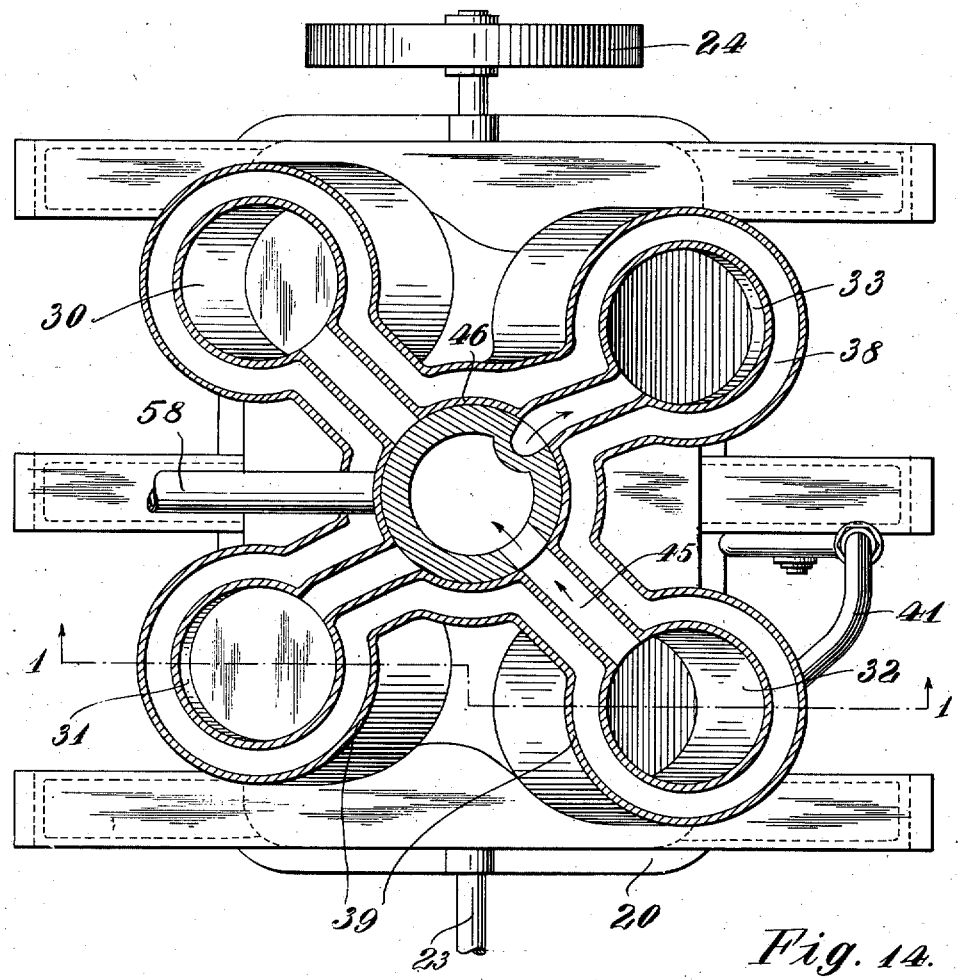

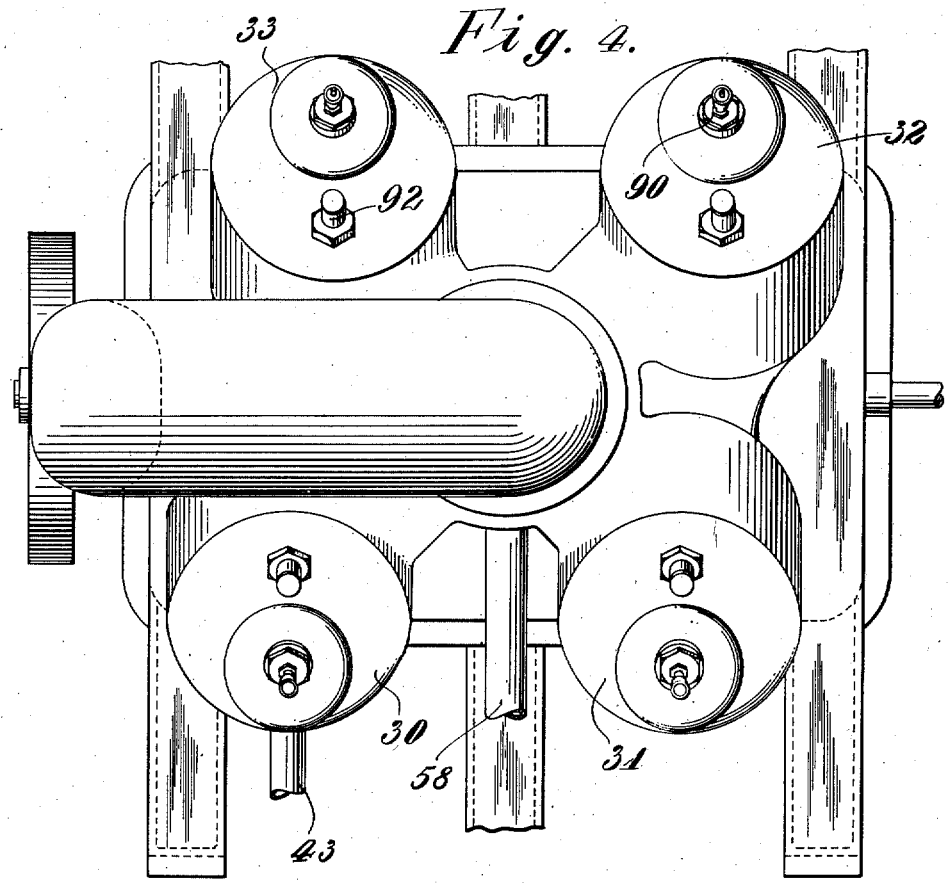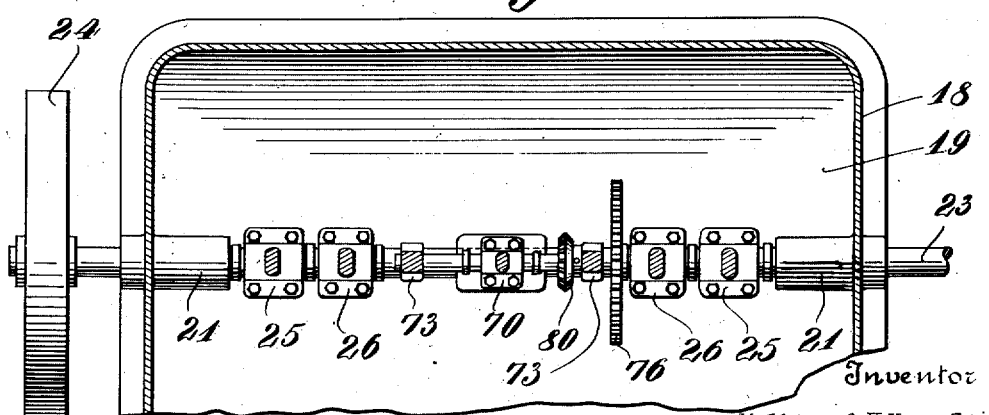

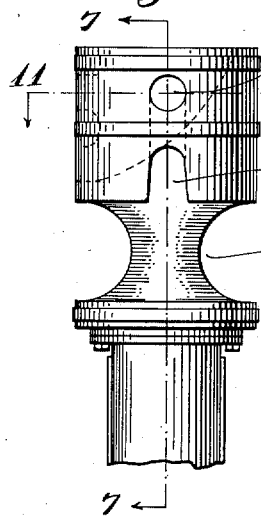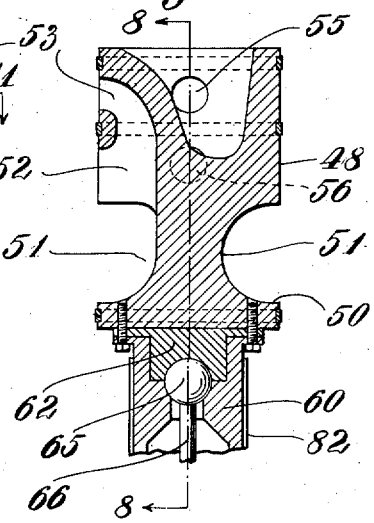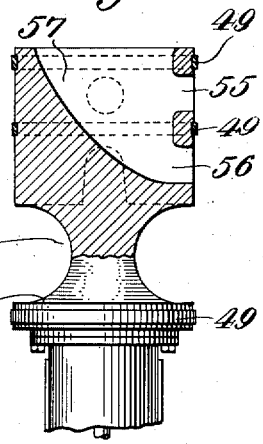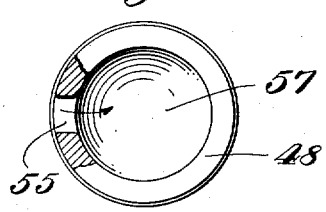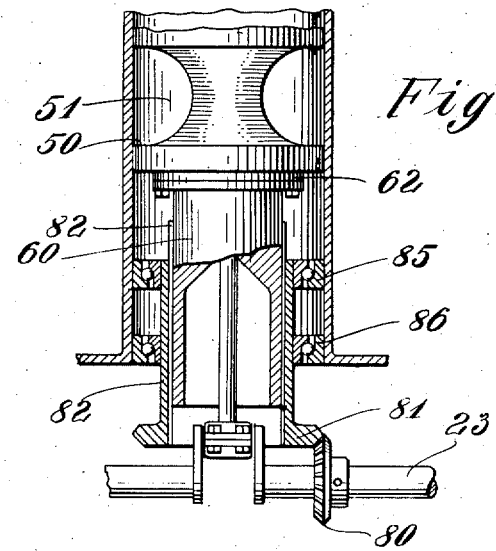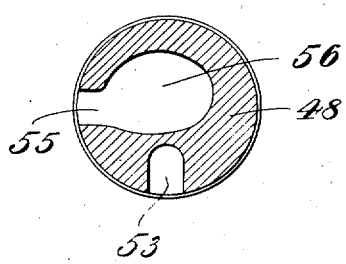

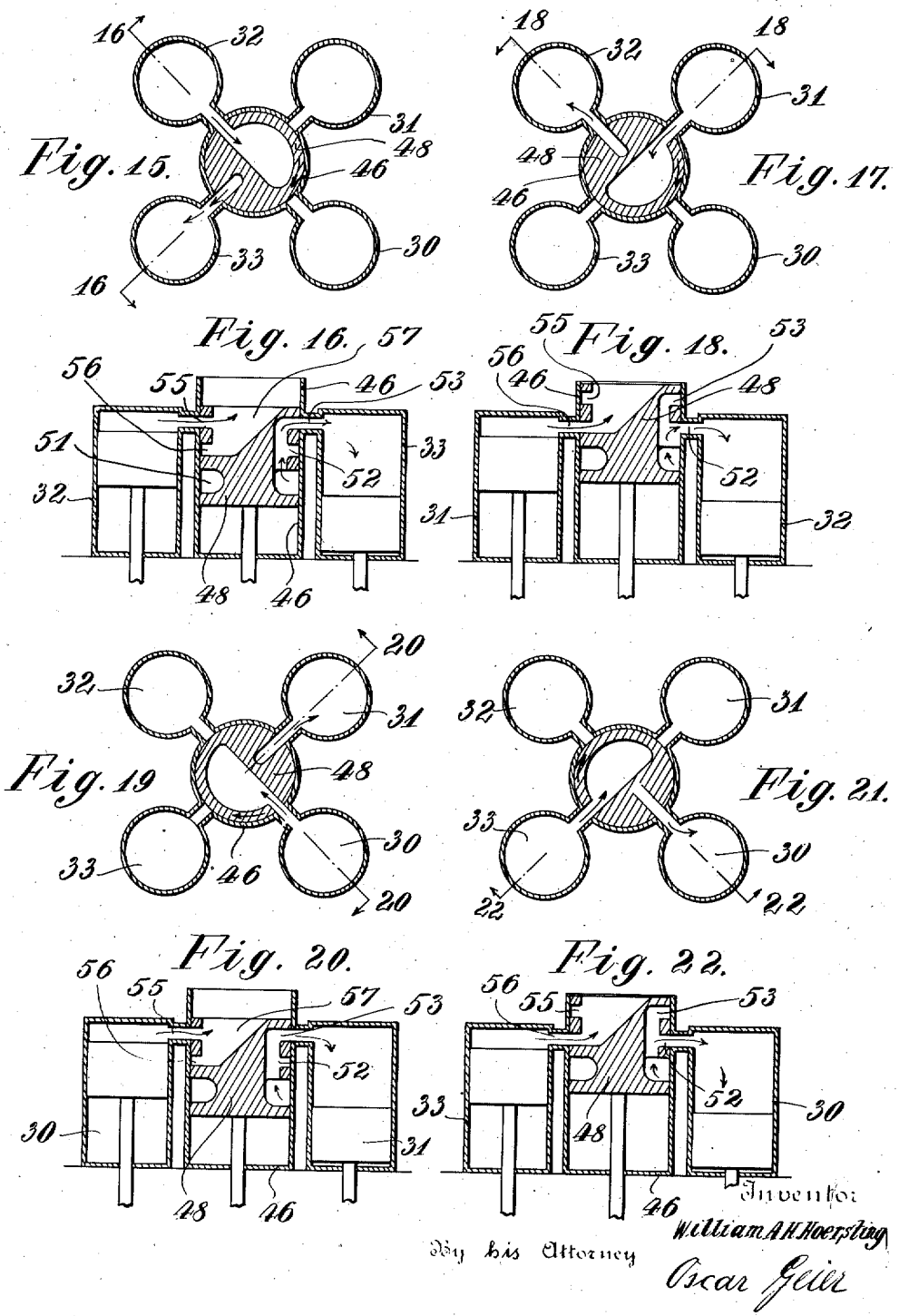

WILLIAM A. H. HOERSTING, OF PLAINFIELD, NEW JERSEY.

INTERNAL-COMBUSTION ENGINE.

1,259,016.  Specification of Letters Patent.  Patented Mar. 12, 1918.

Application filed June 7, 1916. Serial No. 102,350.

*To all whom it may concern:*

Be it known that I, WILLIAM A. H. HOERSTING, a subject of the Emperor of Germany, and a resident of Plainfield, in the county of Union and State of New Jersey, have invented certain new and useful Improvements in Internal-Combustion Engines, of which the following is a specification.

This invention relates to improvements in internal combustion engines of the four cycle type in which the explosive charge is received at one end of the cylinder only.

The principal object of the invention is to provide a motor comprised of few and simple parts, which occupy relatively less space than is common, and which can be manufactured at a moderate cost.

A second object is to provide in such motor, a valve cylinder, whereby that the inlet and exhaust ports are controlled by a single element, timed and operated from the main shaft automatically.

These and other objects, which will become more fully apparent, are attained by the novel construction and combination of parts hereinafter described and shown in the accompanying drawings, forming a material part of this specification, and in which:—

Figure 1 is a vertical sectional view taken substantially on line 1—1 of Fig. 3.

Fig. 2 is another vertical sectional view, taken in a different plane, on line 2—2 of Fig. 1.

Fig. 3 is a transverse sectional view taken on line 3—3 of Fig. 1.

Fig. 4 is a plan view of the entire mechanism.

Fig. 5 is a fragmental transverse sectional view taken on line 5—5 of Fig. 2.

Fig. 6 is an elevational view of the control valve.

Fig. 7 is a vertical sectional view taken on line 7—7 of Fig. 6.

Fig. 8 is another vertical sectional view taken on line 8—8 of Fig. 7.

Fig. 9 is a fragmental assembly view, showing a modification of valve operating parts directly connected with the main shaft.

Fig. 10 is a plan view of the valve as shown in Fig. 6.

Fig. 11 is a similar sectional view taken on line 11—11 of Fig. 6.

Fig. 12 is a diagram indicating the relation of control piston to an engine having three cylinders.

Fig. 13 is a similar view showing four cylinders.

Fig. 14 is another like view showing six cylinders and the arrangement with two control valves, and Figs. 15 to 22 inclusive are diagrammatic representations showing the relative position of the control valve to the several cylinders in their proper sequence, and indicating the passage-ways therebetween.

The motor is of the four cycle principle, in which during four distinct successive movements or strokes of the piston, one only is a working stroke.

When the working piston reaches the bottom of the cylinder, the intake opening is closed by the combined sliding and revolving movement of the control piston, and upon the further revolution of the crank, the working piston moves upward compressing the gas contained in the cylinder.

When the compression has attained its maximum, that is to say when the working piston has reached its upper limit, the ignition of the gas mixture is effected in the regular manner, the gaseous mixture explodes and forces the working piston down again.

During the compression stroke and working stroke, the intake opening and exhaust openings respectively, are closed gas tight by the control piston, so that no gas can escape from the cylinder.

Shortly before the piston again reaches its lower limit, after the explosion of the gas charge in the cylinder, a second opening, also formed in the controlling piston, establishes communication with the exhaust or outlet opening of the cylinder, and the spent gases, formed by combustion escape.

Upon the completion of the exhaust stroke, when the working piston has again reached the upper limit, the exhaust opening becomes closed and the intake opens admitting a new gas charge into the cylinder.

Thus there will follow in succession, charge inlet, compression, working stroke and exhaust stroke in the same sequence as above explained in each cylinder.

The frame or hollow casing is formed in two parts 18 and 20, inclosing an oil chamber 19, and is provided with end and center bearings, respectively 21 and 22, for the main driving shaft 23 which extends outwardly through the casing ends and has one or more drive wheels 24 secured upon it; within the casing, the shaft 23 has crank throws 25 and 26, the same being disposed in pairs diametrically opposite.

Upon the casing 20, in the embodiment shown, are secured four cylinders, 30, 31, 32, and 33, preferably formed from a single casing, bored to receive the pistons 35, which are connected by piston rods 36 with the cranks 25 and 26 of the engine shaft, and arranged in pairs upon opposite sides of the shaft in such manner that their axial planes correspond to their respective cranks, as will be apparent in Figs. 2 and 3.

The upper ends of the cylinder casting are formed with chambers 38 enveloped in jackets 39 providing for water circulation in the cooling of the cylinders, the water entering the pipe 41 from the pump 42 driven in any convenient manner, and passing out through the pipe 43, to a reservoir or returned to the pump.

A single port opening 45 is formed in each cylinder, the same extending substantially radially from a valve cylinder 46 common to all of the cylinders in the group, and which is formed integrally with the cylinder casting; this cylinder is bored to receive the control valve 48, which is moved rectilinearly and also rotated by means hereafter described. The control valve shown, best in Fig. 2, and also in detail in Figs. 6 to 11 inclusive, is grooved to receive packing rings 49 in the usual manner, and is comprised of two principal sections, the lower and lesser 50 of which is separated from the main portion 48 by an annular groove 51, from which extends a longitudinal covered recess 52 upon one side of the valve, the same admitting the charge direct to alternate cylinders and through the port 53 to the other cylinders as the piston is brought into registration with their inlet ports.

Thus it will be clearly perceived that the control valve is constantly rotated and moved reciprocatively as well.

Also formed in the piston 48 are exhaust ports 55 and 56 communicating with an open recess 57 through which the exhaust gases may escape into the atmosphere direct, or be carried away by the pipe 59 as shown in Fig. 2.

Motion is communicated to the valve 48 by reason of its attachment to the hollow plunger 60 and its intermediate connecting element 62, bolts passing through the upper flanged ends of the plunger 60 and corresponding flanges formed with the element 62, while between these elements is secured a globular head 65 in such manner that the same may freely rotate and oscillate therein, but is prevented from longitudinal motion.

Motion is communicated through the stem 66, the lower end of which is engaged with the crank throw 70, formed in the shaft 71, supported in bearings 72, in the frame 73, which connects between the upper and lower section of the frame casing.

Rotary motion is communicated to the shaft 71 by means of the spur gear 75, which meshes with a corresponding gear 76, secured upon the main driving shaft 23 closely adjacent to one of the inner cranks 26, so that rotation of the shaft 71 is uniform and constant, therefore the piston 48 is given a uniform reciprocative motion.

A bevel gear 80 is secured on the shaft 71, the same meshing with a corresponding bevel gear 81, secured to the lower end of a sleeve 82, engaged with the plunger 60 by means of a key 83, the sleeve being carried in a pair of suitably arranged ball bearings 85 and 86, the same being so constructed as to prevent longitudinal motion of the sleeve, which transmits rotary motion to the plunger 60 and hence to the valve 48.

In the adaptation shown in Fig. 9, a slightly different arrangement is indicated in which the sleeve 82, formed with the bevel gear 81, is driven by the bevel pinion 80, but now shown to be mounted directly upon the main driving shaft 23 in place of using an intermediate as before described; in other respects, the construction is the same.

A lubricating means whereby oil may be allowed to enter the cylinder is provided for by the oilers 90 arranged on the upper end of the cylinders, as are also the igniting means or spark plugs 92.

Figs. 12, 13 and 14 indicate very clearly the relative position of the control piston to engines having a plurality of cylinders, for instance, if three cylinders be used, the single control valve would be placed as indicated in Fig. 12. Obviously, if there are six cylinders, the arrangement would be as in Fig. 14, the four cylinder arrangement is shown in Fig. 13, and it would be apparent that eight cylinders would be a duplication of parts shown in Fig. 13.

Referring now more particularly to the diagrams shown in Figs. 15 to 22 inclusive, Figs. 15 and 16 indicate the inlet of the explosive charge through the upper port 53 in the control valve, the exhaust taking place into the control valve through the upper port 55.

In Figs. 17 and 18 the control valve has been rotated 90 degrees and raised so that it is delivering the charge through the port 52 and receiving the exhaust through the port 56.

Figs. 19 and 20 show the control valve turned another quarter of a revolution and lowered so as to bring the ports in a manner similar to that indicated in Figs. 15 and 16.

Figs. 21 and 22 show the control valve again raised and further rotated.

Some of the important advantages obtained by this invention are the use of a single control element on two, three or four cylindered motors.

This construction permits of a great saving of material and labor as compared with ordinary separate valve cylinders, such as are necessary in other motors.

The obvious reduction in the height of the motor over that of similar engines will also be apparent.

There are no springs of any kind used in connection with the apparatus.

The annular groove 51 is made of sufficient capacity to receive the explosive mixture direct through the carbureter through the inlet pipe 58.

Having thus described my invention, what I claim as new and desire to secure by Letters Patent, is:—

1. In an engine, the combination with a body having a plurality of working cylinders, each having a single port, a piston in each of said cylinders, a single shaft, and driving connections between said pistons and said shaft, of a valve cylinder central of said working cylinders open at the top for exhaust and at the bottom for its operative connections, said cylinders being radially disposed with reference to said shaft, a valve having inlet and outlet ports arranged in pairs in the same vertical plane, said inlet ports being disposed at right angles from said outlet ports, packing rings on said piston beyond and between all of said inlet and outlet ports, means for rotating said valve so as to bring one of the inlet ports into registration with the inlet ports in said working cylinders, and means for reciprocating said valve whereby one of said outlet ports is caused to register with the outlet port in the succeeding cylinder.

2. In an engine having a group of working cylinders and a central cylinder having an intake opening, a piston valve movable in said cylinder, a circumferential recess in said valve communicating with said intake opening, a longitudinal recess communicating with said circumferential recess, said longitudinal recess having port openings at two different points, a central exhaust passage open at the top of said valve, ports leading therefrom in circumferential register with said inlet ports, the exhaust and inlet ports being ninety degrees apart, means for moving said piston valve longitudinally and means for rotating said valve.

3. In an engine, the combination with a base, a power shaft rotatable therein, said shaft having oppositely disposed cranks, a body on said base, a chambered casing therebelow, a plurality of grouped working cylinders in said body, said cylinders being disposed at converging angles radial with said shaft, pistons in said cylinders, connections between said pistons and said cranks, a valve cylinder central of said working cylinders open to said casing, an intake opening thereto, a piston valve in said valve cylinder, inlet and outlet ports in said valve registerable with single ports in said working cylinders and means actuated and controlled by rotary motion of said power shaft for rotating and reciprocating said piston valve thereby alining the ports of said valve with the ports of said cylinders, said means being wholly contained in said cylinder.

Signed at New York, in the county of New York, and State of New York, this 20 day of May, A. D. 1916.

WILLIAM A. H. HOERSTING.